US006839354B1

(12) United States Patent
Motoki

(10) Patent No.: US 6,839,354 B1
(45) Date of Patent: Jan. 4, 2005

(54) SCHEDULING CIRCUIT AND SCHEDULING METHOD FOR DEALING WITH SERVICE CLASSES WITH DIFFERING PRIORITIES

(75) Inventor: Akihiro Motoki, Tokyo (JP)

(73) Assignee: NEC Corporation, Tokyo (JP)

( * ) Notice: Subject to any disclaimer, the term of this patent is extended or adjusted under 35 U.S.C. 154(b) by 805 days.

(21) Appl. No.: 09/658,559

(22) Filed: Sep. 8, 2000

(30) Foreign Application Priority Data

Sep. 8, 1999 (JP) .......................................... 11-253730

(51) Int. Cl.$^7$ ............................................. H04L 12/28
(52) U.S. Cl. .................. 370/395.42; 370/414; 370/416; 370/418
(58) Field of Search ................................. 370/360, 386, 370/295.21, 395.3, 395.31, 395.42, 395.43, 411, 419, 395.1, 416, 418, 414, 444

(56) References Cited

U.S. PATENT DOCUMENTS 5,299,190 A * 3/1994 LaMaire et al. ............ 370/413
6,160,812 A * 12/2000 Bauman et al. ............. 370/416
6,570,873 B1 * 5/2003 Isoyama et al. ............ 370/375

FOREIGN PATENT DOCUMENTS

| JP | 9-83547 | 3/1997 |
| JP | 9-326828 | 12/1997 |
| JP | 10-117200 | 5/1998 |
| JP | 11-88374 | 3/1999 |

* cited by examiner

Primary Examiner—Chau Nguyen
Assistant Examiner—Soon-Dong Hyun
(74) Attorney, Agent, or Firm—Young & Thompson

(57) ABSTRACT

The assignment result reception circuit 11 receives the accumulation assignment result from the external portion, and sends the already-assigned input port and output port information to the assignment request mask circuit 12. The assignment request mask circuit 12 uses the already-assigned input port and output port information received from the assignment result reception circuit 11, performs the mask process on the connection assignment request received from the external portion, and sends its result to the M×N scheduler circuit 13. The M×N scheduler circuit 13 determines the assignment of the port connection in accordance with the information received from the assignment request mask circuit 12, and sends the connection assignment result to the external portion and the assignment result transmission circuit 14. The assignment result transmission circuit 14 carries out the logical OR between the connection assignment result received from the M×N scheduler circuit 13 and the accumulation assignment result received from the external portion, and outputs to the external portion. Thus, it is possible to carry out the connection assignment effectively with small waste.

14 Claims, 9 Drawing Sheets

SCHEDULING CIRCUIT AND SCHEDULING METHOD FOR DEALING WITH SERVICE CLASSES WITH DIFFERING PRIORITIES

BACKGROUND OF THE INVENTION

1. Field of the Invention

The present invention relates to a scheduling circuit and a scheduling method used for the same. More particularly, the present invention relates to a scheduling technique for establishing a priority between a plurality of service classes in the same port and then carrying out a scheduling.

2. Description of the Related Art

Conventionally, as this type of a scheduling technique, a scheduling technique is well known which employs a plurality of M×N schedulers and then establishes a priority between a plurality of service classes in the same port. This technique is disclosed in Japanese Laid Open Patent Application (JP-A-Heisei, 9-326828).

FIG. 1 shows a configuration of a scheduling circuit used for the above-mentioned technique. In this scheduling circuit, connection assignment requests $S51_1$, $S51_2$, ..., $S52_k$ respectively corresponding to k kinds of service classes in which priorities are different from each other are inputted to M×N schedulers $5_1$, $5_2$, ..., $5_k$ in the order starting with the service class having a higher priority and then carries out the scheduling.

The respective M×N schedulers $5_1$, $5_2$, ..., $5_k$ carry out scheduling operations i.e. connection assignments independently of each other, and output connection assignment results $S52_1$, $S52_2$, ..., $S52_k$, respectively. Because the respective M×N schedulers $5_1$, $5_2$, ..., $5_k$ carry out the scheduling operations independently of each other, there may be a fear that two or more M×N schedulers give the connection assignments to one input port or output port.

However, when the connection is actually done, the two or more connection assignments must not be given to the one input or output port. Thus, this requires an assignment result arbitration circuit 60 to carry out an arbitration between the output connection assignment results $S52_1$, $S52_2$, ..., $S52_k$.

In the conventional scheduling technique, let us suppose that in a case of k=3, connection assignment results for three service classes through the M×N schedulers $5_1$, $5_2$, and $5_3$, are as shown on a middle portion of FIG. 2.

In this case, when the arbitration is performed in the assignment result arbitration circuit 60 by employing in the order starting with the assignment result of the service class having the higher priority, the arbitrated result shown as a matrix on a bottom portion of FIG. 2 is obtained. Within the matrix of the arbitrated result, a circular mark represented by a solid line indicates the actually assigned connection, and a circular mark represented by a dashed line indicates a lost connection because of the arbitration. A numeral within the circular mark indicates the priority.

When the arbitrated result is considered, there is the connection lost by the arbitration in the assignment result arbitration circuit 60, although the connection assignments were performed by the M×N schedulers $5_1$, $5_2$, and $5_3$.

If assignment conditions of service classes having a higher priority are known in advance, there may be a case that another connection assignment is possible. If such an assignment is possible, a transfer efficiency is dropped in the conventional technique. For example, if the assignment conditions of the service classes having the higher priority are known in advance, it is possible to assign a connection in a manner represented by a star mark of FIG. 2. Thus, there is no connection lost by the arbitration. Hence, the transfer efficiency is never dropped.

The above-mentioned problem is caused by such a fact that the port assignment result is not shared by the schedulers when the scheduling operations are performed by the plurality of M×N schedulers.

As a related technique, Japanese Laid Open Patent Application (JP-A-Heisei, 10-117200) discloses a switch, a cross connection switching device, a connection device, and a routing method in a switch. This technique is provided with a connection unit which is connected between an input port of a cross connection switching unit and a plurality of data units and can be driven so as to transfer data to the input port from the different data units at times different from each other. Thus, a large number of data ports can be accommodated without restriction on the number of input output ports of cross connection switching units.

Japanese Laid Open Patent Application (JP-A-Heisei, 11-88374) discloses a large capacity of multiple-class core ATM switch architecture. In this architecture, a switch effectively adjusts real time and non-real time multiple-cast flows. The switch is provided with a fast core module for mutually connecting input/output modules each having a large capacity of a buffer and an intelligent scheduling/buffer management mechanism. Scheduling can be achieved by using a new dynamic rate control for controlling an inner congestion and then attaining a fare throughput performance between flows competing in a switch bottleneck section. In a method for controlling a dynamic rate, the flow is controlled at a rate based on a congestion information monitored by the bottleneck section in the switch. A rate in which a dynamic rate component for fairly distributing a non-usage bandwidth is added to a minimum service rate is insured for each switch flow.

SUMMARY OF THE INVENTION

The present invention has been made to solve the above-described problems, and therefore, has an object to provide a scheduling circuit that can carry out a connection assignment effectively with small waste, and a scheduling method used for the same.

A scheduling circuit according to a first embodiment of the present invention has a plurality of schedulers for carrying out a port connection assignment of a cross point switch having M (M is a natural number) input ports and N (N is a natural number) output ports, assigns a plurality of service classes to the plurality of schedulers, respectively, and carries out a port connection assignment in accordance with a priority between the plurality of service classes. Then, each of the plurality of schedulers carries out the port connection assignment in accordance with a connection assignment result in a scheduler dealing with a higher priority class than that of a self-scheduler and a connection assignment request received from external portion.

A scheduling method according to a second embodiment of the present invention is a scheduling method of a scheduling circuit, which has a plurality of schedulers for carrying out a port connection assignment of a cross point switch having M (M is a natural number) input ports and N (N is a natural number) output ports, assigns a plurality of service classes to the plurality of schedulers, respectively, and carries out a port connection assignment in accordance with a priority between the plurality of service classes. Then, each of the plurality of schedulers carries out a connection assignment in which a duplication is not induced in a connection assignment result in a scheduler dealing with a higher priority class than that of a self-scheduler, in an order starting from a scheduler dealing with a service class having a higher priority to a scheduler dealing with a service class having a lower priority.

That is, the scheduling method of the present invention is designed so as to transfer the connection assignment result in the scheduler dealing with the higher priority class to the scheduler dealing with the lower priority class, in the scheduling method which uses the plurality of schedulers for carrying out the port connection assignment of the cross point switch having the M (M is a natural number) and the N (N is a natural number), assigns the plurality of service classes to individual schedulers, respectively, and carries out the port connection assignment in accordance with the priority between the plurality of service classes.

Thus, there is no connection lost by the arbitration work, and there is no drop of a transfer efficiency. Hence, it is possible to carry out the connection assignment effectively with small waste. Also, the duplication of the ports with regard to the connection assignment result is not induced in both the input port and the output port. Hence, the assignment result arbitration circuit is not required.

DESCRIPTION OF THE PREFERRED EMBODIMENTS

Now, embodiments of the present invention will be described below with reference to the drawings.
(First Embodiment)

Figure 1:
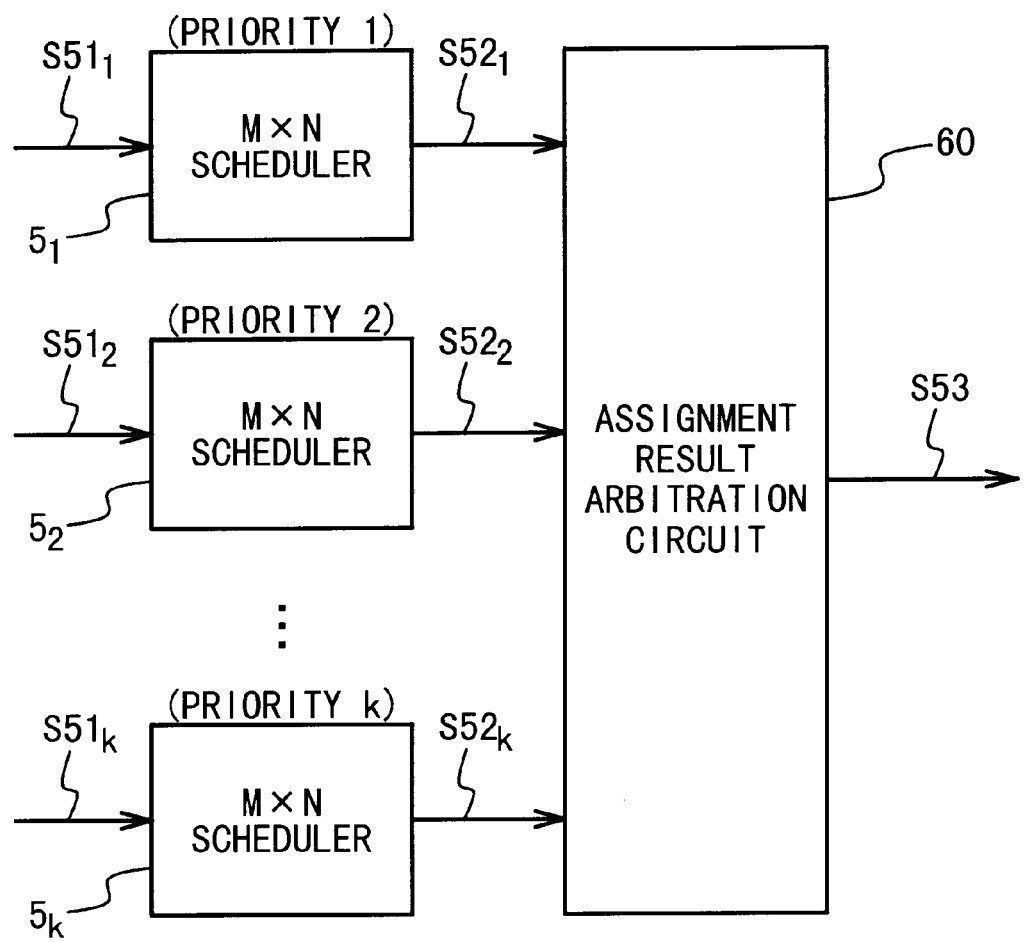
FIG. 1 is a block diagram showing a configuration of a scheduling circuit according to a conventional example.
Figure 2:
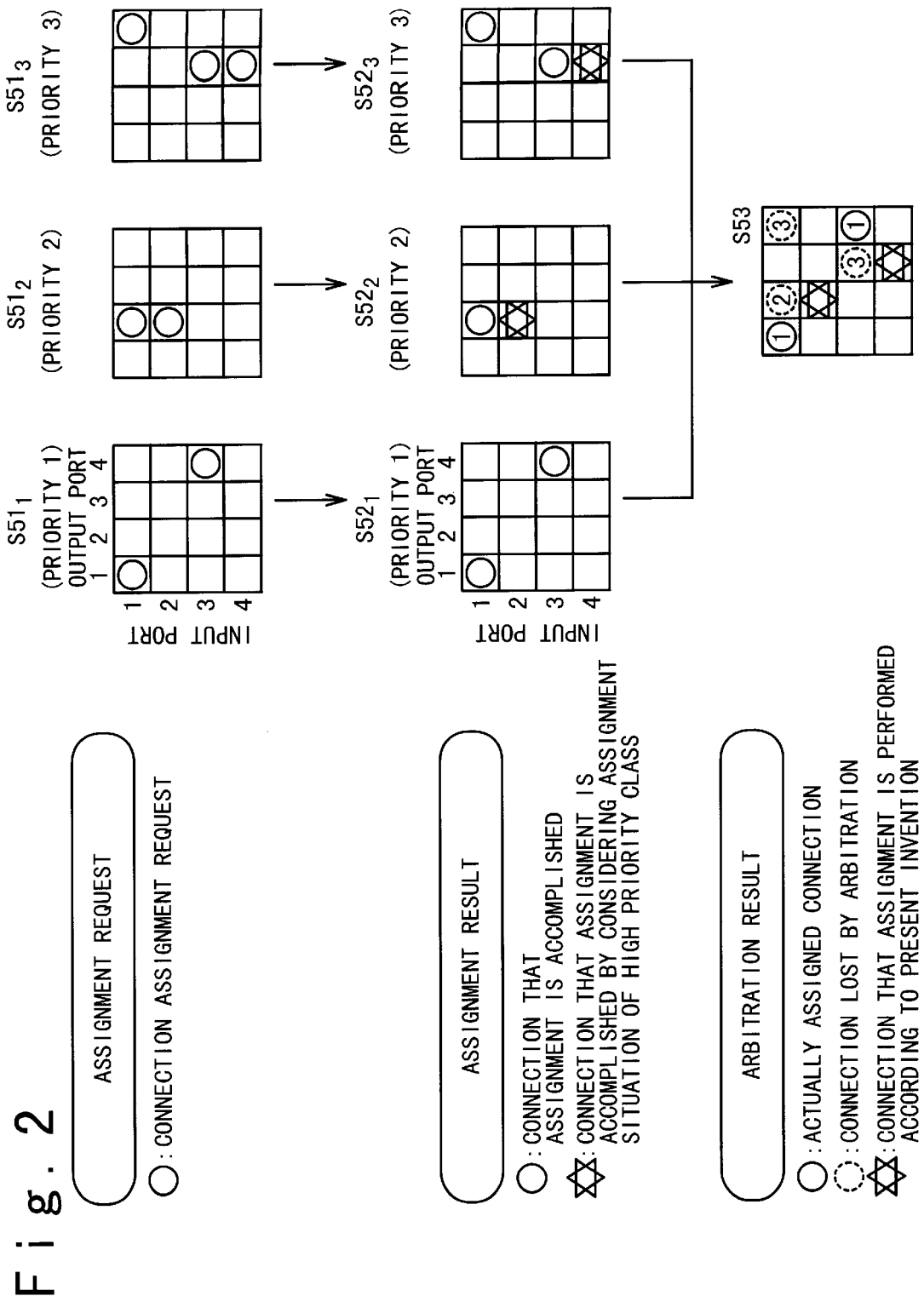
FIG. 2 is an explanatory diagram describing problems in a conventional technique and describing the present invention.
Figure 3:
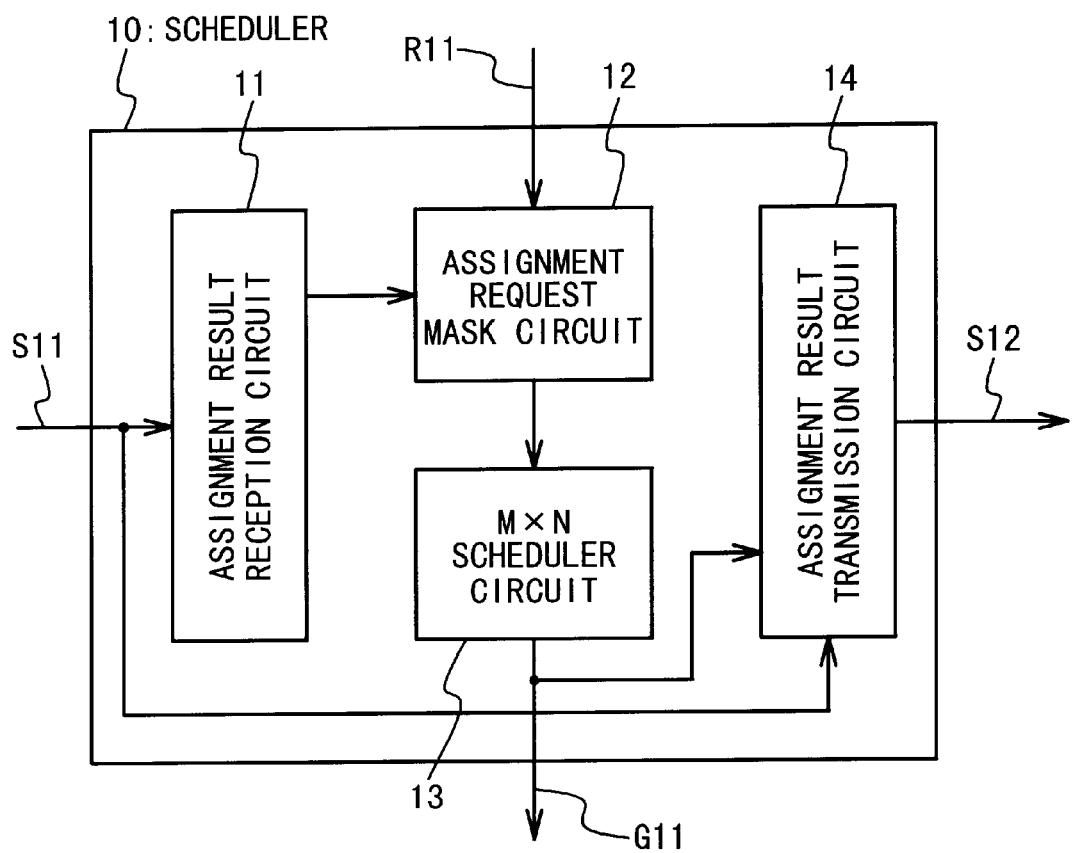
FIG. 3 is a block diagram showing a configuration of a scheduler according to a first embodiment of the present invention.

FIG. 3 is a block diagram showing a configuration of a scheduler 10 according to a first embodiment of the present invention. The scheduler 10 is composed of an assignment result reception circuit 11, an assignment request mask circuit 12, an M×N scheduler circuit 13 and an assignment result transmission circuit 14.

The assignment result reception circuit 11 receives an accumulation assignment result S11 from an external portion, and sends an already-assigned input port and output port information to the assignment request mask circuit 12. The assignment request mask circuit 12 performs a mask process in response to a connection assignment request R11 received from the external portion by using the already-assigned input port and output port information received from the assignment result reception circuit 11, and then sends the result of the mask process to the M×N scheduler circuit 13.

The M×N scheduler circuit 13 assigns a port connection in accordance with the information received from the assignment request mask circuit 12, and sends a connection assignment result G11 to the external portion, and also sends the connection assignment result G11 to the assignment result transmission circuit 14. The assignment result transmission circuit 14 carries out the logical OR between the connection assignment result received from the M×N scheduler circuit 13 and the accumulation assignment result S11 received from the external portion, and sends to the external portion as an accumulation assignment result S12.

Figure 4:
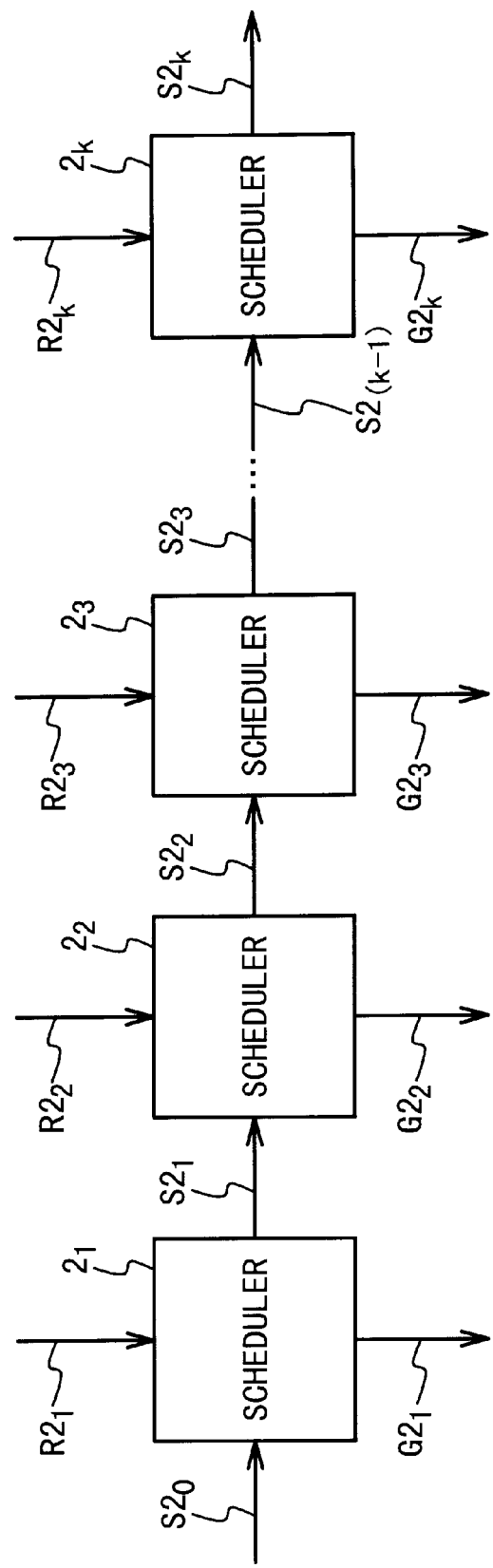
FIG. 4 is a block diagram showing a configuration of a scheduling circuit according to the first embodiment of the present invention.

FIG. 4 is a block diagram showing the configuration of a scheduling circuit according to the first embodiment of the present invention. This scheduling circuit is composed of k ("k" is a natural number) schedulers $2_1, 2_2, 2_3, \ldots, 2_k$.

The scheduler $2_1$ sends an accumulation assignment result $S2_1$ to the schedulers $2_2$. The scheduler $2_2$ sends an accumulation assignment result $S2_2$ to the scheduler $2_3$. When this is generalized, the scheduler $2_i$ ("i" is an integer between "1" to "k−1") sends an accumulation assignment result $S2_i$ to the scheduler $2_{(i+1)}$. It should be noted that each configuration of the schedulers $2_1, 2_2, 2_3, \ldots, 2_k$ is similar to that of the scheduler 10 shown in FIG. 3, and the operation thereof is also similar.

An inner operation of each of the schedulers $2_1, 2_2, 2_3, \ldots, 2_k$ will be described below with reference to FIG. 3.

The assignment result reception circuit 11 detects an input port and an output port which are already at a used state, based on the accumulation assignment result S11 received from the external portion, and sends used port information generated based on the detection to the assignment request mask circuit 12. The used port information is information indicative of the input port and the output port that are at the used state.

The assignment request mask circuit 12 invalidates a connection assignment request to the used port in the connection assignment request R11 inputted from the external portion of the scheduler 10, on the basis of the used port information received from the assignment result reception circuit 11.

More concretely, all connection assignment requests with regard to an input port "s" are invalidated if the input port "s" ("s" is an integer between "1" and "M") is already at the used state. Also, all connection assignment requests with regard to an output port "d" is invalidated if the output port "d" ("d" is an integer between "1" and "N") is already at the used state. The assignment request mask circuit 12 performs the above-mentioned operation on all the input ports and the output ports. Then, the assignment request mask circuit 12 sends the connection assignment request changed by the above-mentioned operations to the M×N scheduler circuit 13.

The M×N scheduler circuit 13 carries out the scheduling between M input ports and N output ports, in accordance with the information received from the assignment request mask circuit 12. Any algorithm may be used in this scheduling.

The M×N scheduler circuit 13 sends the connection assignment result G11 generated by the scheduling to the assignment result transmission circuit 14, and also sends to the external portion of the scheduler 10.

The assignment result transmission circuit 14 adds the connection assignment result received from the M×N scheduler circuit 13, to the accumulation assignment result S11 inputted from the external portion of the scheduler 10, and sends the added result to the external portion as a accumulation assignment result S12.

As a method for communicating an accumulation assignment result between schedulers adjacent to each other, there may be a first method for sending a combination of input and output ports to which the connection assignments are given by using an M×N matrix, and a second method for sending the information of already-assigned input and output ports. As a method similar to the second method, there is a method for sending the information of non-used input and output ports.

The operations of the scheduling circuit according to the first embodiment of the present invention, namely, the operations of the schedulers $2_1, 2_2, 2_3, \ldots, 2_k$ will be described below with reference to FIG. 4.

In the scheduling circuit and scheduling method according to the first embodiment of the present invention, the connection assignment between the M input ports and the N output ports is determined. Traffics of a plurality of service classes (hereafter, k service classes) are accommodated in the same port. The connection assignment is performed in the order starting with a service class having a higher priority.

The connection assignment request is inputted to the schedulers $2_1, 2_2, 2_3, \ldots, 2_k$ in a form of matrix for each service class. The matrix of the connection assignment request is constituted by M rows×N columns. M is equal to the number of input ports, and N is equal to the number of output ports. The matrix is prepared for each service class, and it represents a connection request belonging to each service class.

A connection assignment request $R2_1$ of a service class having the highest priority is inputted to the schedulers $2_1$. A connection assignment request $R2_2$ of a service class having the next highest priority is inputted to the schedulers $2_2$. After that, the connection assignment request is inputted to the scheduler corresponding to the service class, in the similar manner. Furthermore, a connection assignment request $R2_k$ of a service class having the lowest priority is inputted to the schedulers $2_k$.

Each of the schedulers $2_1, 2_2, 2_3, \ldots, 2_k$ receives the connection assignment request and the accumulation assignment result from a scheduler dealing with a service class having an adjacently higher priority. Then, it carries out the connection assignment so as not to use the input and output ports to which the connection assignment is already given, and outputs its connection assignment result.

At the same time, each of the schedulers $2_1, 2_2, 2_3, \ldots, 2_k$ sends to a scheduler dealing with a service class having an adjacently lower priority, the accumulation assignment result updated by reflecting a newly generated connection assignment result in the received accumulation assignment result.

An accumulation assignment result $S2_0$ inputted to the scheduler $2_1$ is information indicating that the connection assignment is not performed at all, namely, all the ports can be selected.

The scheduler $2_1$ carries out the scheduling based on the connection assignment request $R2_1$ and the accumulation assignment result $S2_0$, and sends the connection assignment result $G2_1$ to the external portion, and simultaneously sends the accumulation assignment result $S2_1$ to the schedulers $2_2$.

The scheduler $2_1$ carries out the scheduling having the highest priority. Thus, the accumulation assignment result $S2_1$ sent to the scheduler $2_2$ is perfectly equal to the connection assignment result $G2_1$.

The scheduler $2_2$ receives a connection assignment request $R2_2$ and the accumulation assignment result $S2_1$ from the scheduler $2_1$. The scheduler $2_2$ invalidates the assignment requests with regard to the input and output ports to which the connection assignments are already given by the scheduler $2_1$, in the connection assignment request $R2_2$, based on the accumulation assignment result $S2_1$. Then, the scheduler $2_2$ carries out the scheduling based on the thus-updated connection assignment request, and sends the connection assignment result $G2_2$ to the external portion.

At the same time, the scheduler $2_2$ sends an accumulation assignment result $S2_2$ to the scheduler $2_3$. The accumulation assignment result $S2_2$ is a sum of the connection assignment results determined by the schedulers $2_1$ and $2_2$.

The scheduler $2_3$ receives a connection assignment request $R2_3$ and the accumulation assignment result $S2_2$ from the scheduler $2_2$. The scheduler $2_3$ invalidates the assignment requests with regard to the input and output ports to which the connection assignments are already given by the schedulers $2_1$ and $2_2$, in the connection assignment request $R2_3$, based on the accumulation assignment result $S2_2$. Then, the scheduler $2_3$ carries out the scheduling based on the thus-updated connection assignment request, and sends the connection assignment result $G2_3$ to the external portion.

At the same time, the scheduler $2_3$ sends an accumulation assignment result $S2_3$ to the scheduler $2_4$ (not shown). The accumulation assignment result $S2_3$ is a sum of the connection assignment results determined by the schedulers $2_1, 2_2$ and $2_3$.

After that, the operations similar to the above-mentioned operations are performed until the scheduler $2_{(k-1)}$. The scheduler $2_k$ receives a connection assignment request $R2_k$ and an accumulation assignment result $S2_{(k-1)}$ from the scheduler $2_{(k-1)}$.

The scheduler $2_k$ invalidates the assignment requests with regard to the input and output ports to which the connection assignments are already given by the scheduler dealing with the service class having the higher priority than that of the scheduler $2_k$, in the connection assignment request $R2_k$, based on the accumulation assignment result $S2_{(k-1)}$. Then, the scheduler $2_k$ carries out the scheduling based on the thus-updated connection assignment request, and sends a connection assignment result $G2_k$ to the external portion.

At the same time, the scheduler $2_k$ sends an accumulation assignment result $S2_k$ to the external portion. The accumulation assignment result $S2_k$ is a sum of the connection assignment results determined by the schedulers $2_1, 2_2, 2_3, \ldots, 2_k$.

The connection assignment results $G2_1, G2_2, G2_3, \ldots, G2_k$ can be generated by the above-mentioned operations. Since the accumulation assignment results are sent and received between the plurality of schedulers $2_1, 2_2, 2_3, \ldots, 2_k$, one input port and one output port are never selected two times or more in each of the connection assignment results $G2_1, G2_2, G2_3, \ldots, G2_k$. Thus, it is not necessary to check the presence or absence of duplicate the input ports or the output ports between the connection assignment results $G2_1, G2_2, G2_3, \ldots, G2_k$.

Figure 5:
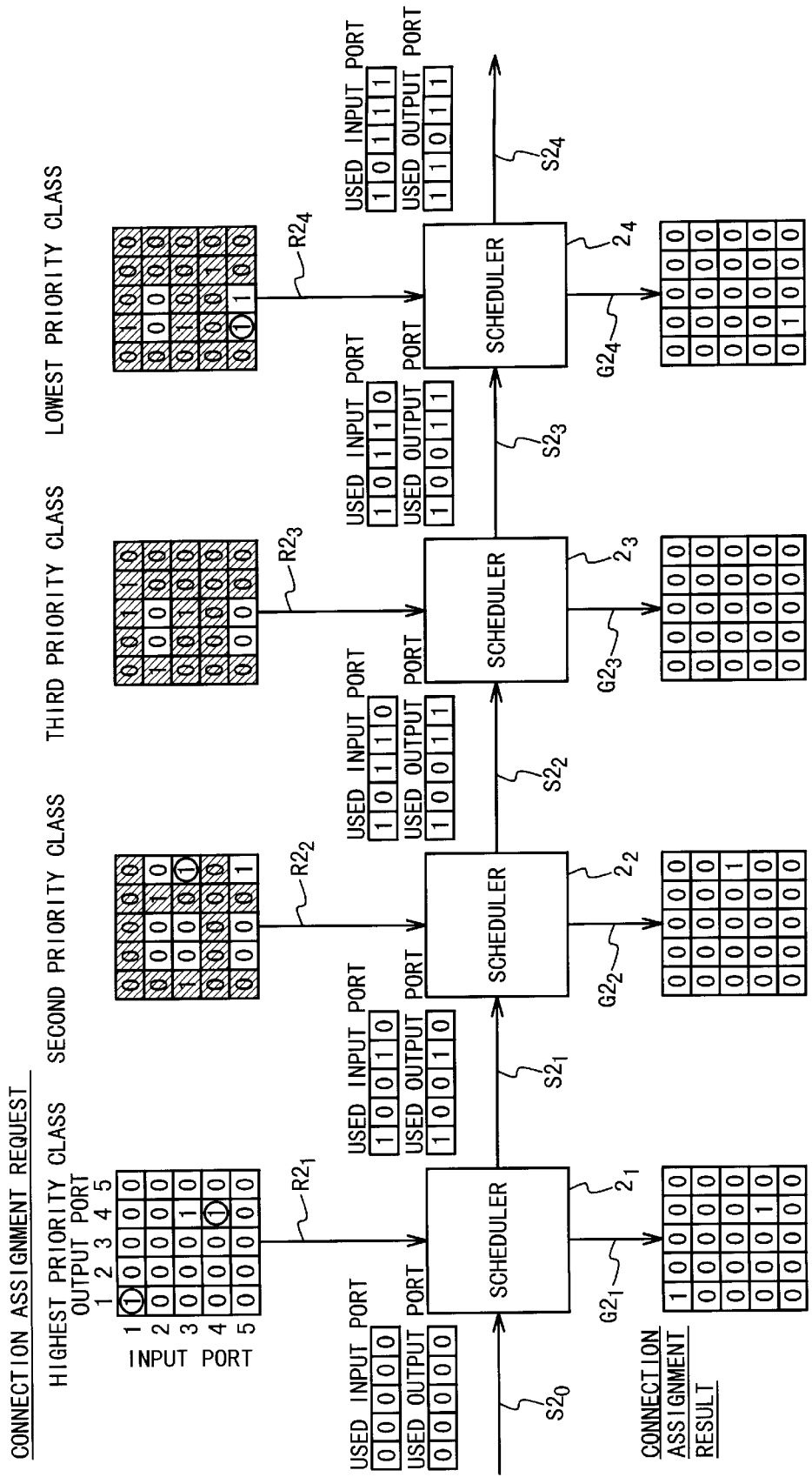
FIG. 5 is a block diagram showing a configuration of a scheduling circuit according to a first example of the first embodiment of the present invention.

FIG. 5 is a block diagram showing the configuration of a first example of the scheduling circuit according to the first embodiment of the present invention. This scheduling circuit is designed such that the number M of input ports is limited to "5", the number N of output ports is limited to "5" and the number k of service classes is limited to "4", in the scheduling circuit according to the first embodiment of the present invention shown in FIG. 4.

This scheduling circuit has four service classes having different priorities. A connection assignment request of each service class is represented by a 5×5 matrix. A vertical axis of the matrix indicates the input ports, and a horizontal axis indicates the output ports. If an element specified by an input port "s" and an output port "d" is "1", this implies that there is a connection assignment request from the input port "s" to the output port "d".

In the above-mentioned configuration, the connection assignment requests of the highest priority class, the second highest priority class, the third highest priority class and the lowest priority class are inputted to the schedulers $2_1$, $2_2$, $2_3$ and $2_4$, respectively.

The matrix of the connection assignment results outputted from the schedulers $2_1$, $2_2$, $2_3$ and $2_4$ is also defined similarly to the above-mentioned matrix. A section in which an element is "1" indicates a combination of input and output ports to which the connection assignments are given. Hereafter, an element determined by an input port s and an output port d is described as (s,d).

In this first example, used input port information and used output port information are used as the accumulation assignment results communicated between the schedulers $2_1$, $2_2$, $2_3$ and $2_4$. In this case, a port in which a value of an element of the matrix is "1" indicates that it is already used. Hereafter, the used input port information and the used output port information are collectively referred to as a used port information.

In the above-mentioned configuration, there is no scheduler having a higher priority than that of the scheduler $2_1$. Thus, the used input port information and the used output port information which are inputted to the scheduler $2_1$ are all "0".

In the scheduler $2_1$, there is no used input and output ports. Thus, the input assignment request $R2_1$ is inputted to the M×N scheduler circuit 13 without any change. Here, let us suppose that the M×N scheduler circuit 13 carries out the connection assignment shown in the connection assignment result $G2_1$ of FIG. 5. It should be noted that the M×N scheduler circuit 13 can employ any scheduling algorithm.

The assignment result transmission circuit 14 generates used input port information and used output port information based on used port information $S2_0$ and the connection assignment result $G2_1$ received from the M×N scheduler circuit 13. The connection assignments generated in the scheduler $2_1$ are (1,1) and (4,4). Thus, the scheduler $2_1$ generates used input port information in which "1" are set at positions corresponding to input ports 1, 4 and used output port information in which "1" are set at positions corresponding to output ports 1, 4, and sends to the scheduler $2_2$ as used port information $S2_1$.

The scheduler $2_2$ receives the used port information $S2_1$ from the scheduler $2_1$ at the assignment result reception circuit 11, and sends to the assignment request mask circuit 12. The assignment request mask circuit 12 performs a mask process to the inputted connection assignment request $R2_2$, based on the used port information received from the assignment result reception circuit 11.

The assignment request mask circuit 12 invalidates the connection assignment requests in relation to the input ports 1, 4 in which the used input port information are set to "1" and the output ports 1, 4 in which the used output port information are set to "1". As shown FIG. 5, all elements in the slant section of the matrix in the connection assignment request $R2_2$ are replaced with "0" by the mask process in the assignment request mask circuit 12.

Let us suppose that the M×N scheduler circuit 13 executes the connection assignment based on the connection assignment request updated by the assignment request mask circuit 12 and then carries out the connection assignment shown in the connection assignment result $G2_2$. The assignment result transmission circuit 14 calculates used input port information and used output port information, based on the inputted used port information and the connection assignment result $G2_2$ received from the M×N scheduler circuit 13.

The connection assignment generated by the scheduler $2_2$ is (3,5). Thus, "1" is set at a position corresponding to an input port 3 which is further newly assigned to the used input port information received from the scheduler $2_1$. So, a total of three sections becomes at the used state. Also in the case of the used output port information, "1" is set at a position corresponding to an output port 5, similarly to the input port. Thus, in this case, a total of three sections becomes at the used state.

The scheduler $2_2$ sends the updated used port information $S2_2$ to the scheduler $2_3$. The assignment results in the schedulers $2_1$, and $2_2$ are reflected in the used port information $S2_2$.

The scheduler $2_3$ receives the used port information $S2_2$ from the scheduler $2_2$ at the assignment result reception circuit 11, and sends to the assignment request mask circuit 12. The assignment request mask circuit 12 performs the mask process to the input connection assignment request $R2_3$, based on the used port information received from the assignment result reception circuit 11.

The assignment request mask circuit 12 invalidates the connection assignment requests in relation to the input ports 1, 3 and 4 in which the used input port information are set to "1" and the output ports 1, 4 and 5 in which the used output port information are set to "1". As shown FIG. 5, all elements in the slant section of the matrix in the connection assignment request $R2_3$ are replaced with "0" by the mask process in the assignment request mask circuit 12.

The M×N scheduler circuit 13 executes the connection assignment based on the connection assignment request updated by the assignment request mask circuit 12. However, all the connection assignment requests are replaced with "0" by the mask process. Thus, the connection assignment is not performed. In short, the matrix of the connection assignment result $G2_3$ is perfectly set to "0".

The assignment result transmission circuit 14 calculates used input port information and used output port information, based on the inputted used port information $S2_2$ and the connection assignment result $G2_3$ received from the M×N scheduler circuit 13. However, the connection assignment is not done. Thus, it sends the used port information received from the scheduler $2_2$ without any change, to the scheduler $2_4$.

The scheduler $2_4$ receives a connection assignment request $R2_4$ and the used port information $S2_3$ from the scheduler $2_3$, and carries out the operations similar to those of the scheduler $2_3$, and then sends a connection assignment result $G2_4$ and a used port information $S2_4$. The assignment results in the schedulers $2_1$, $2_2$, $2_3$ and $2_4$ are reflected in the used port information $S2_4$.

As mentioned above, any input port and any output port are never selected two times or more in the connection assignment results $G2_1$, $G2_2$, $G2_3$ and $G2_4$. This is because the accumulation assignment result (the used port information in this first example) is sent from the scheduler having the higher priority to the scheduler having the lower priority to thereby invalidate the connection assignment requests in relation to the already used input/output ports.

Figure 6:
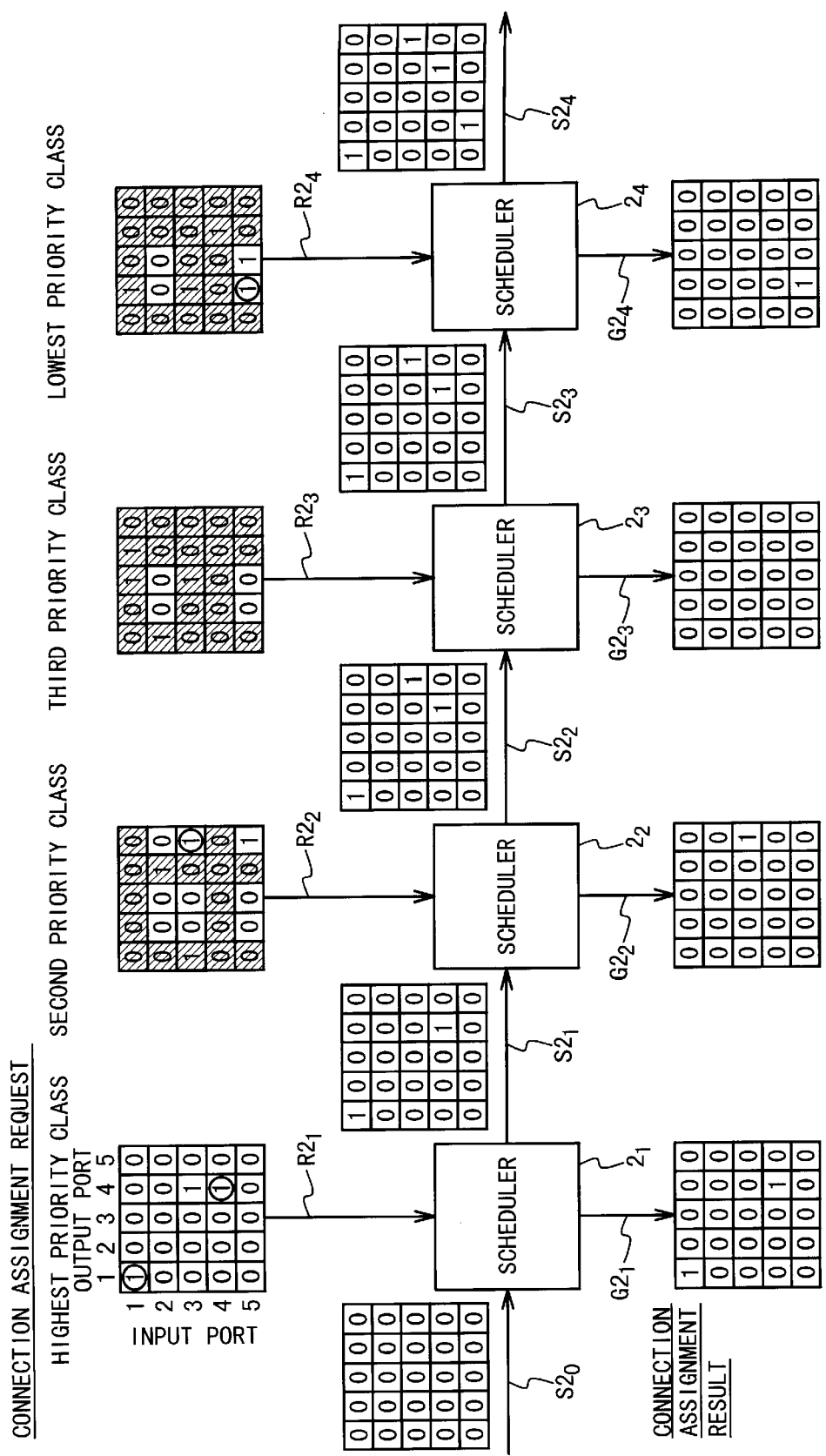
FIG. 6 is a block diagram showing a configuration of a scheduling circuit according to a second example of the first embodiment of the present invention.

FIG. 6 is a block diagram showing the configuration of a second example of the scheduling circuit according to the first embodiment of the present invention. This scheduling circuit is designed such that the number M of input ports is limited to "5", the number N of output ports is limited to "5" and the number k of service classes is limited to "4", in the scheduling circuit according to the first embodiment of the present invention shown in FIG. 4.

In this second example, the corresponding relation to the scheduler for inputting the service class and the connection assignment request, the definitions of the matrixes of the connection assignment request and the connection assignment result, the operations of the assignment request mask circuit 12 and the M×N scheduler circuit 13 in each scheduler are perfectly equal to those of the first example. As the differences between the second example and the first example, there are three points of the method for sending the accumulation assignment result, the operation of the assignment result reception circuit 11 and the operation of the assignment request mask circuit 12.

As the accumulation assignment result in the communication between the schedulers, the M×N matrix is used for including the combination of the input and output ports to which the connection assignments are already given. The definition of the matrix indicative of the accumulation assignment result is similar to that of the connection assignment result. If the connection assignment is given from the input port "s" to the output port "d", "1" is set for the element (s,d) of the matrix. The element of the matrix corresponding to the combination of the input and output ports to which the connection assignments are not given is "0".

The operations of the schedulers $2_1$, $2_2$, $2_3$ and $2_4$ in this second example are perfectly equal to those of the first example. The operations of the assignment result reception circuit 11 and the assignment result transmission circuit 14 will be described below by using the scheduler $2_2$ as one example.

The assignment result reception circuit 11 detects an input port and an output port which are already assigned by the scheduler dealing with the service class having the higher priority than that of the scheduler $2_2$, based on the accumulation assignment result $S2_1$ received from the scheduler $2_1$. In this second example, it is detected that the input ports 1 and 4 are already assigned and the output ports 1 and 4 are already assigned. The information with regard to the generated assigned input and output ports is sent to the assignment request mask circuit 12.

The assignment result transmission circuit 14 carries out the logical OR between the connection assignment result $G2_2$ received from the M×N scheduler circuit 13 and the accumulation assignment result $S2_1$ sent by the scheduler $2_1$ for each element of the matrix, and generates a new accumulation assignment result $S2_2$, and then sends to the scheduler $2_3$. By comparing the accumulation assignment result $S2_2$ with the accumulation assignment result $S2_1$, it is understood that an element (3,5) assigned by the scheduler $2_2$ is added to the accumulation assignment result $S2_2$.

(Second Embodiment)

Figure 7:
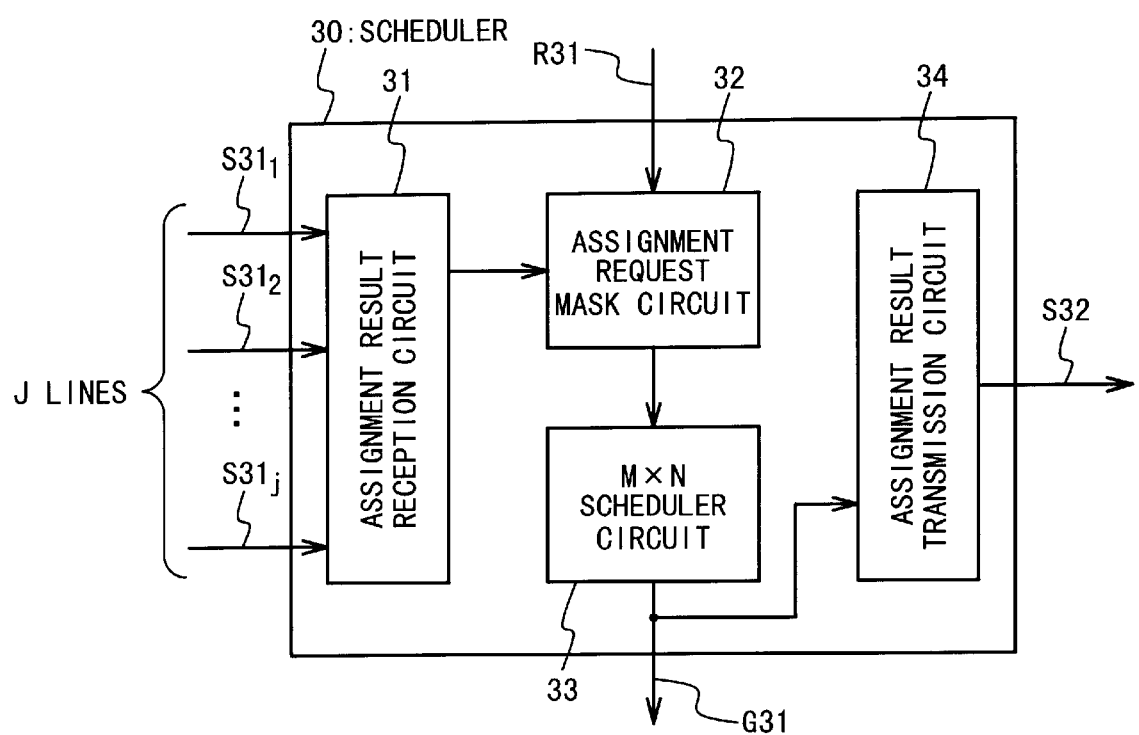
FIG. 7 is a block diagram showing a configuration of a scheduler according to a second embodiment of the present invention.

FIG. 7 is a block diagram showing the configuration of a scheduler 30 according to a second embodiment of the present invention. The scheduler 30 is composed of an assignment result reception circuit 31, an assignment request mask circuit 32, an M×N scheduler circuit 33 and an assignment result transmission circuit 34.

The assignment result reception circuit 31 receives "j" ("j" is a natural number) port connection assignment results from external portion, and sends an already-assigned input port and output port information to the assignment request mask circuit 32. The number "j" of port connection assignment results inputted to the assignment result reception circuit 31 is different for each scheduler.

The assignment request mask circuit 32 performs a mask process in response to a connection assignment request R31 received from the external portion by using the already-assigned input port and output port information received from the assignment result reception circuit 31, and then sends the result of the mask process to the M×N scheduler circuit 33.

The M×N scheduler circuit 33 assigns a port connection in accordance with the information received from the assignment request mask circuit 32, and sends a connection assignment result G31 to the external portion and also sends the connection assignment result G31 to the assignment result transmission circuit 34. The assignment result transmission circuit 34 outputs the connection assignment result G31 received from the M×N scheduler circuit 33, to the external portion as an accumulation assignment S32.

Figure 8:
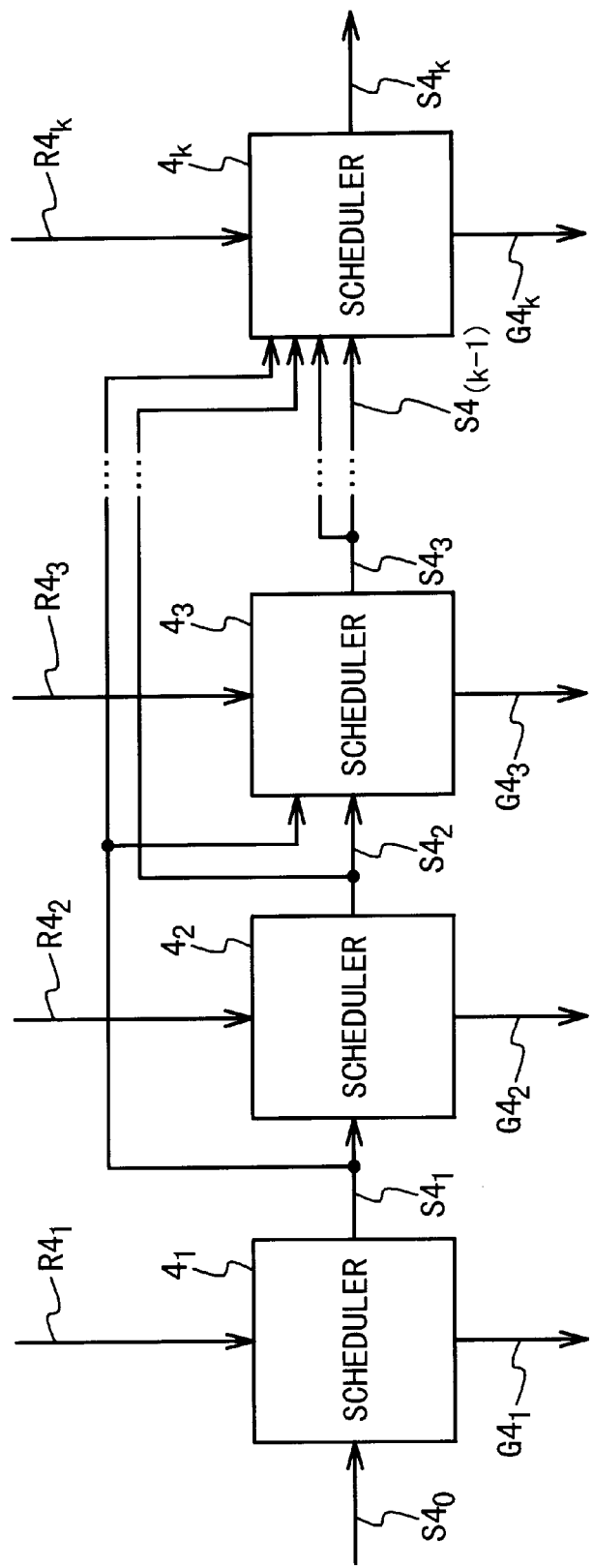
FIG. 8 is a block diagram showing a configuration of a scheduling circuit according to the second embodiment of the present invention.

FIG. 8 is a block diagram showing the configuration of a scheduling circuit according to the second embodiment of the present invention. This scheduling circuit is composed of k ("k" is a natural number) schedulers $4_1$, $4_2$, $4_3$, . . . , $4_k$.

The scheduler $4_1$ sends a connection assignment result $S4_1$ to the schedulers $4_2$, $4_3$, . . . , $4_k$. The scheduler $4_2$ sends a connection assignment result $S4_2$ to the schedulers $4_3$, $4_4$, . . . , $4_k$. When this is generalized, the scheduler $4_i$ ("i"=an integer between "1" to "k−1") sends a connection assignment result $S4_i$ to the schedulers $4_{(i+1)}$, $4_{(i+2)}$, . . . , $4_k$.

It should be noted that each configuration of the schedulers $4_1$, $4_2$, $4_3$, . . . , $4_k$ is similar to that of the scheduler 30 shown in FIG. 7, and the operation thereof is also similar. In this case, the number j of port connection assignment results inputted to the assignment result reception circuit 31 is different for each of the schedulers $4_1$, $4_2$, $4_3$, . . . , $4_k$. In a case of the scheduler $4_i$ ("i"="1" to "k−12), j=i−1.

An inner operation of each of the schedulers $4_1$, $4_2$, $4_3$, . . . , $4_k$ will be described below with reference to FIG. 7.

The assignment result reception circuit 31 receives connection assignment results $S31_1$ to $S31_j$ inputted from the external portion, and detects an input port and an output port which are already at the used state, based on the received information, and then sends used port information generated based on the detection to the assignment request mask circuit 32. The used port information is information indicative of the input port and output port which are at the used state.

The assignment request mask circuit 32 invalidates a connection assignment request to the used port in the connection assignment request R31 inputted from the external portion of the scheduler 30, on the basis of the used port information received from the assignment result reception circuit 31.

More concretely, all connection assignment requests with regard to an input port "i" are invalidated if the input port "i" is already at the used state. Also, all connection assignment requests with regard to an output port "j" is invalidated if the output port "j" is already at the used state. The assignment request mask circuit 32 performs the above-mentioned operation on all the input and output ports. Then, the assignment request mask circuit 32 sends the connection assignment request changed by the above-mentioned operation to the M×N scheduler circuit 33.

The M×N scheduler circuit 33 carries out the scheduling between M input ports and N output ports, in accordance with the information received from the assignment request mask circuit 32. Any algorithm may be used in the scheduling.

The M×N scheduler circuit 33 sends the connection assignment result G31 generated by the scheduling to the assignment result transmission circuit 34, and also sends to the external portion of the scheduler 30. The assignment result transmission circuit 34 sends the connection assignment result G31 received from the M×N scheduler circuit 33, as the connection assignment result G32, to the external portion of the scheduler 30.

As a method for communicating a connection assignment results $S4_1, S4_2, S4_3, \ldots, S4_k$ between the schedulers, there may be a first method for sending the combination of the input and output ports to which the connection assignments are given by using the M×N matrix, and the second method for sending the information of already-assigned input and output ports. As the method similar to the second method, there is the method for sending the information of non-used input and output ports.

The operations of the scheduling circuit according to the second embodiment of the present invention, namely, the operations of the schedulers $4_1, 4_2, 4_3, \ldots, 4_k$ will be described below with reference to FIG. 8. In this case, the inputted connection assignment request is perfectly similar to that of the scheduling circuit according to the first embodiment of the present invention.

Each of the schedulers $4_1, 4_2, 4_3, \ldots, 4_k$ receives the connection assignment request and the connection assignment results from all schedulers dealing with service classes having higher priorities. Then, it calculates the input and output ports already assigned by the schedulers having the higher priorities. Then, it carries out the connection assignment so as not to use the already-assigned input and output ports generated through the calculation, and outputs the connection assignment results. At the same time, each of the schedulers $4_1, 4_2, 4_3, \ldots, 4_k$ sends the connection assignment results to all schedulers having lower priorities.

A connection assignment result $S4_0$ inputted to the scheduler $4_1$ is information indicating that the connection assignment is not performed at all, namely, all the ports can be selected. The scheduler $4_1$ carries out the scheduling based on the connection assignment request $R4_1$ and the connection assignment result $S4_0$, and sends the connection assignment result $G4_1$ to the external portion, and simultaneously sends the connection assignment result $S4_1$ to the schedulers $4_2, 4_3, \ldots, 2_k$.

The scheduler $4_2$ receives a connection assignment request $R4_2$ and the connection assignment result $S4_1$ from the scheduler $4_1$. The scheduler $4_2$ invalidates the assignment requests with regard to the input and output ports to which the connection assignments are already given by the scheduler $4_1$, in the connection assignment request $R4_2$, based on the connection assignment result $S4_1$. Then, the scheduler $4_2$ carries out the scheduling based on the thus-updated connection assignment request, and sends the connection assignment result $G4_2$. At the same time, the scheduler $4_2$ sends a connection assignment result $S4_2$ to the schedulers $4_3, \ldots, 4_k$.

The scheduler $4_3$ receives a connection assignment request $R4_3$ and the connection assignment results $S4_1, S4_2$ from the schedulers $4_1, 4_2$. The scheduler $4_3$ invalidates the assignment requests with regard to the input and output ports to which the connection assignments are already given by the schedulers $4_1, 4_2$, in the connection assignment request $R4_3$, based on the received connection assignment results $S4_1, 4_2$. Then, the scheduler $4_3$ carries out the scheduling based on the thus-updated connection assignment request, and sends the connection assignment result $G4_3$ to the external portion. At the same time, the scheduler $4_3$ sends a connection assignment result $S4_3$ to the schedulers $4_4, \ldots, 4_k$.

After that, the operations similar to the above-mentioned operations are done until a scheduler $4_{(k-1)}$ (the scheduler $4_{(k-1)}$ is not shown). The scheduler $4_k$ receives a connection assignment request $R4_k$ and the connection assignment results $S4_1, S4_2, S4_3, \ldots, S4_{(k-1)}$ from the schedulers $4_1, 4_2, 4_3, \ldots, 4_{(k-1)}$.

The scheduler $4_k$ invalidates the assignment requests with regard to the input and output ports to which the connection assignments are already given by the schedulers dealing with the service classes having the higher priorities than that of the scheduler $4_k$, in the connection assignment request $R4_k$, based on the received connection assignment results $S4_1, S4_2, S4_3, \ldots, S4_{(k-1)}$. Then, the scheduler $4_k$ carries out the scheduling based on the thus-updated connection assignment request, and sends a connection assignment result $G4_k$ to the external portion. At the same time, the scheduler $4_k$ sends a connection assignment result $S4_k$ to the external portion.

The connection assignment results $G4_1, G4_2, G4_3, \ldots, G4_k$ can be generated by the above-mentioned operations. Since, the connection assignment results are communicated between the plurality of schedulers $4_1, 4_2, 4_3, \ldots, 4_k$, one input port and one output port are never selected two times or more, in each of the connection assignment results $G4_1, G4_2, G4_3, \ldots, G4_k$.

Figure 9:
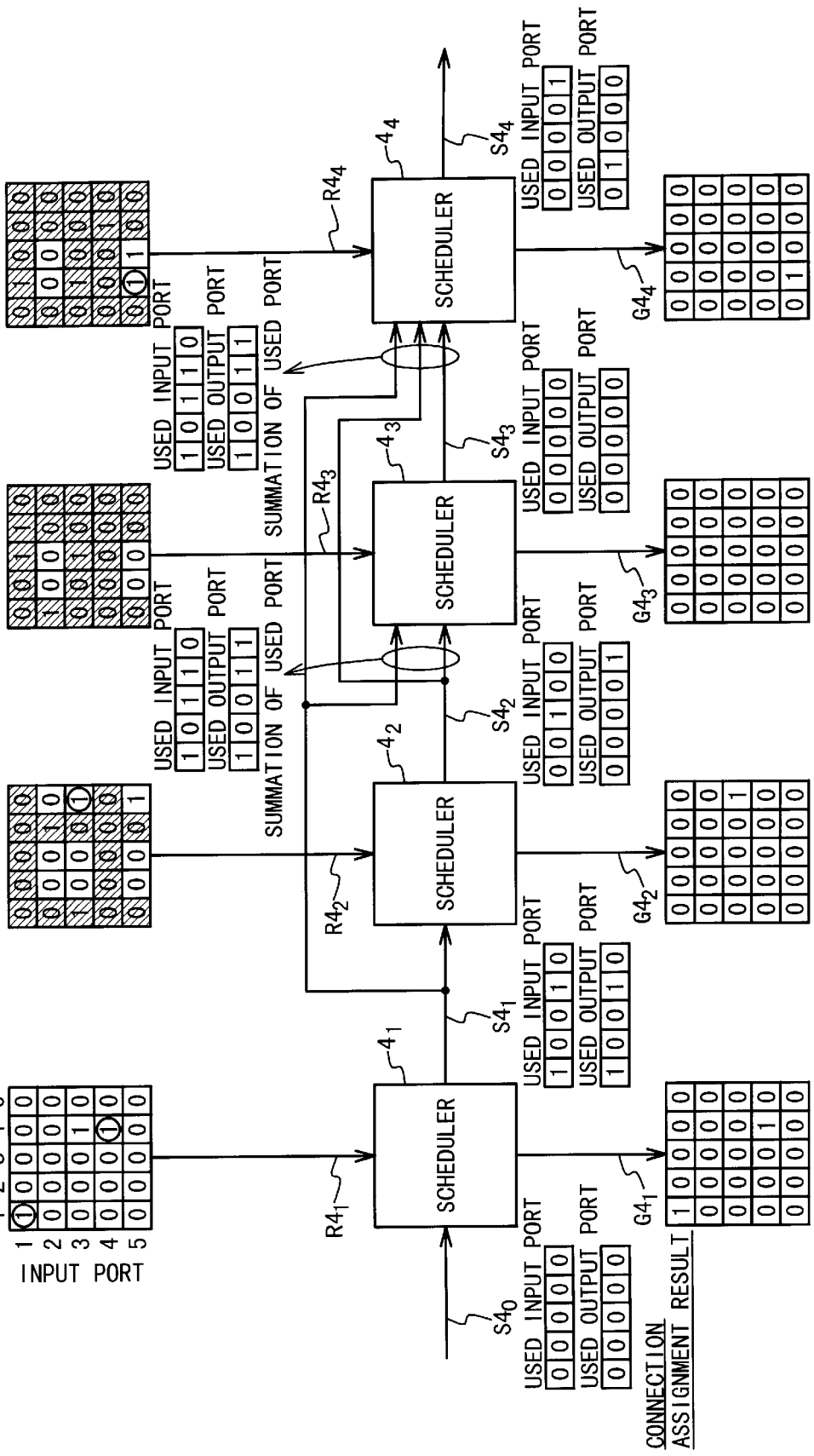
FIG. 9 is a block diagram showing a configuration of an example of the scheduling circuit according to the second embodiment of the present invention.

FIG. 9 is a block diagram showing the configuration of an example of the scheduling circuit according to the second embodiment of the present invention. This scheduling circuit is designed such that the number M of input ports is limited to "5", the number N of output ports is limited to "5" and the number k of service classes is limited to "4", in the scheduling circuit according to the second embodiment of the present invention shown in FIG. 8.

In this example, the corresponding relation to the scheduler for inputting the service class and the connection assignment request, and the definitions of the matrixes of the connection assignment request and the connection assignment result are perfectly equal to those of the above described first example.

In this example, the used input port information and the used output port information are used instead of the accumulation assignment result in the communication between the schedulers. In this case, a port corresponding to an element of the matrix is "1" indicates that it is already used. Hereafter, the used input port information and the used output port information are collectively referred to as the used port information.

In the above-mentioned configuration, there is no scheduler having a higher priority than that of the scheduler $4_1$. Thus, "0" is set to both the used input port information and the used output port information which are inputted to the scheduler $4_1$.

In the scheduler $4_1$, there is no used port in the input and output ports. Thus, the input assignment request $R4_1$ is inputted to the M×N scheduler circuit 33 without any change. Here, let us suppose that the M×N scheduler circuit 33 carries out the connection assignment shown in the connection assignment result $G4_1$ of FIG. 9. It should be noted that it is possible to freely select a scheduling algorithm to be used in the M×N scheduler circuit 33.

The assignment result transmission circuit 34 generates used input port information and used output port information based on the connection assignment result G4$_1$ received from the M×N scheduler circuit 33. The connection assignments generated in the scheduler 4$_1$ are (1,1) and (4,4). Thus, the scheduler 4$_1$ generates used input port information in which "1" are set at positions corresponding to input ports 1, 4 and used output port information in which "1" are set at positions corresponding to output ports 1, 4, as used port information S4$_1$.

The used port information S4$_1$ outputted from the scheduler 4$_1$ is sent to all the schedulers having the lower priorities than that of the scheduler 4$_1$, namely, the schedulers 4$_2$, 4$_3$ and 4$_4$.

The scheduler 4$_2$ receives a used port information S4$_1$ from the scheduler 4$_1$ at the assignment result reception circuit 31, and sends to the assignment request mask circuit 32. The assignment request mask circuit 32 performs a mask process to the inputted connection assignment request R4$_2$, based on the used port information received from the assignment result reception circuit 31.

The assignment request mask circuit 32 invalidates the connection assignment requests in relation to the input ports 1, 4 in which the used input port information are set to "1" and the output ports 1, 4 in which the used output port information are set to "1". As shown FIG. 9, all elements in the slant section of the matrix in the connection assignment request R4$_2$ are replaced with "0" by the mask process in the assignment request mask circuit 32.

Let us suppose that the M×N scheduler circuit 33 executes the connection assignment based on the connection assignment request updated by the assignment request mask circuit 32 and then carries out the connection assignment shown in the connection assignment result G4$_2$.

The assignment result transmission circuit 34 calculates used input port information and used output port information, based on the connection assignment result G4$_2$ received from the M×N scheduler circuit 33. The connection assignment generated by the scheduler 4$_2$ is (3,5). Thus, "1" is set at a position corresponding to an input port 3 of the used input port information, and "0" is set at all position corresponding to the other ports. As for the used output port information, similarly to the above-mentioned input ports, "1" is set at a position corresponding to an output port 5, and "0" is set at all positions corresponding to the other ports.

The used port information S4$_2$ outputted from the scheduler 4$_2$ is sent to all schedulers having lower priorities than that of the scheduler 4$_2$, namely, the schedulers 4$_3$, 4$_4$. So, only the assignment result in the scheduler 4$_2$ is reflected in the used port information S4$_2$.

The scheduler 4$_3$ receives the used port information S4$_1$, S4$_2$ from the schedulers 4$_1$, 4$_2$, respectively, at the assignment result reception circuit 31, and calculates the logical OR between the used port information S4$_1$, and S4$_2$ to accordingly determine the already-used input port information and output port information.

The thus-determined used input port information indicates that the input ports 1, 3 and 4 are already used, and the used output port information indicates that the output ports 1, 4 and 5 are already used. The used port information determined by the assignment result reception circuit 31 in this manner is sent to the assignment request mask circuit 32.

The assignment request mask circuit 32 performs the mask process to the input connection assignment request R4$_3$, based on the used port information received from the assignment result reception circuit 31. The assignment request mask circuit 32 invalidates the connection assignment requests in relation to the input ports 1, 3 and 4 in which the used input port information are set to "1" and the output ports 1, 4 and 5 in which the used output port information are set to "1". As shown FIG. 9, all elements in the slant section of the matrix in the connection assignment request R4$_3$ are replaced with "0" by the mask process in the assignment request mask circuit 32.

The M×N scheduler circuit 33 executes the connection assignment based on the connection assignment request updated by the assignment request mask circuit 32. However, all the connection assignment requests are replaced with "0" by the mask process. Thus, the connection assignment is not performed. In short, the matrix of the connection assignment result G4$_3$ is perfectly set to "0".

The assignment result transmission circuit 34 calculates used input port information and used output port information, based on the connection assignment result G4$_3$ received from the M×N scheduler circuit 33. However, the connection assignment is not done. Thus, all the used port information are set to "0" (implying the non-used port), and sent to the scheduler 4$_4$. Only the assignment result in the scheduler 4$_3$ is reflected in the used port information S4$_3$.

The scheduler 4$_4$ receives the used port information S4$_1$, S4$_2$ and S4$_3$ from the schedulers 4$_1$, 4$_2$ and 4$_3$ having the higher priorities than that of the scheduler 4$_4$ at the assignment result reception circuit 31, and calculates the logical OR between the used port information S4$_1$, S4$_2$ and S4$_3$ similar to that of the scheduler 4$_3$, and determines the already-used port, and then sends to the assignment request mask circuit 32.

The assignment request mask circuit 32 carries out a connection request mask process, similarly to the case of the scheduler 4$_3$, based on the connection assignment request R4$_4$ and the used port information. The M×N scheduler circuit 33 executes the connection assignment based on the updated connection assignment request, and assumes that the connection assignment shown in the connection assignment result G4$_4$ of FIG. 9 is done.

The assignment result transmission circuit 34 calculates used input port information and used output port information, based on the connection assignment result G4$_4$ received from the M×N scheduler circuit 33, and outputs the connection assignment result S4$_4$. Only the assignment result in the scheduler 4$_4$ is reflected in the used port information S4$_4$.

Any input port and any output port are never selected two times or more in the connection assignment results G4$_1$, G4$_2$, G4$_3$ and G4$_4$. This is because the connection assignment result (the used port information in this example) is sent from the scheduler having the higher priority to the scheduler having the lower priority to thereby invalidate the connection assignment requests in relation to the already used input port/output port.

As mentioned above, due to the usage of the plurality of M×N schedulers, among the schedulers for carrying out the connection assignment considering the priority between the plurality of service classes, the scheduler dealing with the lower priority class can refer to the connection assignment result of the scheduler dealing with the high priority class to thereby carry out the connection assignment effectively with small waste.

As mentioned above, the present invention can provide the scheduling circuit which can carry out the connection assignment effectively with small waste, and the scheduling method used for the same.

What is claimed is:

1. A scheduling circuit comprising:

a plurality of schedulers to which a plurality of service classes and differing priorities are assigned, respectively;

wherein said plurality of schedulers carries out port connection assignments to assign input ports and output ports to be used in switching operations, each of the plurality of schedulers making respective said port connection assignments based on a connection assignment result received directly from at least one other of said plurality of schedulers which has a relatively higher priority if a higher priority said scheduler exists, in response to a connection assignment request externally received, and wherein each of said plurality of schedulers provides another of said connection assignment results to at least one relatively lower priority said scheduler if such a lower priority said scheduler exists.

2. The scheduling circuit according to claim 1, wherein each of said plurality of schedulers carries out the port connection assignment such that input ports and output ports to be used in the switching operation are not overlapped with the input ports and the output ports designated by the connection assignment result from said at least scheduler having a higher priority.

3. The scheduling circuit according to claim 2, wherein each of said plurality of schedulers includes an assignment request mask circuit which masks said connection assignment request corresponding to the input ports and the output ports designated by the connection assignment result from said at least scheduler having the higher priority.

4. The scheduling circuit according to claim 3, wherein each of said plurality of schedulers further includes an assignment result transmission circuit which transmits said connection assignment result obtained by said port connection assignment directly to at least one of said plurality of schedulers which has a relatively lower priority.

5. The scheduling circuit according to claim 4, wherein said connection assignment result is composed of information representing the input ports and the output ports which are already used.

6. The scheduling circuit according to claim 4, wherein said connection assignment result is composed of information representing the input ports and the output ports which are not yet used.

7. The scheduling circuit according to claim 4, wherein said connection assignment result is composed of an M×N matrix indicative of combinations of the input ports and the output ports to which the connection assignments have been performed, where, M is a natural number and represents the number of the input ports and N is a natural number and represents the number of the output ports.

8. A scheduling method comprising:

providing a plurality of schedulers to which a plurality of service classes and differing priorities are assigned, respectively; and carrying out a port connection assignment to assign input ports and output ports to be used in a switching operation in each of said plurality of schedulers, each of the plurality of schedulers making respective said port connection assignments based on a connection assignment result received directly from at least one other of said plurality of schedulers which has a relatively higher priority if a higher priority said scheduler exists, in response to a connection assignment request externally received, and wherein each of said plurality of schedulers provides another of said connection assignment results to at least one relatively lower priority said scheduler if such a lower priority said scheduler exists.

9. The scheduling method according to claim 8, wherein said carrying out step performs such that input ports and output ports to be used in the switching operation are not overlapped with the input ports and the output ports designated by the connection assignment result from said at least scheduler having a higher priority.

10. The scheduling method according to claim 9, wherein said carrying out step includes:

masking said connection assignment request corresponding to the input ports and the output ports designated by the connection assignment result from said at least scheduler having the higher priority.

11. The scheduling method according to claim 10, said carrying out step includes:

transmitting a connection assignment result obtained by said port connection assignment directly to at least one of said plurality of schedulers which has a relatively lower priority.

12. The scheduling method according to claim 11, wherein said connection assignment result is composed of information representing an input port and an output port which are at a used state.

13. The scheduling circuit according to claim 11, wherein said connection assignment result is composed of information representing the input ports and the output ports which are not yet used.

14. The scheduling circuit according to claim 11, wherein said connection assignment result is composed of an M×N matrix indicative of combinations of the input ports and the output ports to which the connection assignments have been performed, where, M is a natural number and represents the number of the input ports and N is a natural number and represents the number of the output ports.

* * * * *